Jan 6, 1931.  A. H. KEHOE  1,787,943
SYSTEM OF DISTRIBUTION OF ALTERNATING CURRENTS
Filed Feb. 1, 1924  3 Sheets-Sheet 1

WITNESSES:
INVENTOR.
Arthur H. Kehoe.
BY
ATTORNEY

Patented Jan. 6, 1931

1,787,943

UNITED STATES PATENT OFFICE

ARTHUR H. KEHOE, OF NEW YORK, N. Y., ASSIGNOR TO WESTINGHOUSE ELECTRIC & MANUFACTURING COMPANY, A CORPORATION OF PENNSYLVANIA

SYSTEM OF DISTRIBUTION OF ALTERNATING CURRENTS

Application filed February 1, 1924. Serial No. 690,014.

My invention relates to systems of electrical distribution and particularly to systems of distribution of alternating current in which a plurality of transformers are arranged to supply energy to a common secondary low-tension network.

One object of my invention is to provide a system of control whereby the secondary winding of a transformer may be connected to a secondary network when the primary winding of the transformer is energized through a high-tension primary circuit from a main station and the transformer is in energy-delivering condition relative to the low-tension network.

Another object of my invention is to provide a distribution system, of the above-indicated character, that shall have automatically controlled switching means for disconnecting the secondary winding of a transformer from the low tension network when the direction of flow of energy between the secondary winding of the transformer and the low tension network is reversed and that shall automatically reconnect the transformer to the network when the proper direction of energy flow is resumed and the transformer is in energy-delivering condition, both as regards the voltage and the phase relation relative to the network.

My invention thus comprehends an automatic reclosing circuit interrupter for controlling the connection and disconnection of transformers to secondary networks.

In practicing my invention, I provide means responsive to the direction of the potential gradient between the transformer and the network, and to the potential difference between the transformer and the network for controlling the connection of the transformer to the network. I also provide means responsive to the direction of energy transfer between the transformer and the network to control the disconnection of the transformer when the energy is fed to the transformer from the secondary network instead of from the transformer to the secondary network.

Inasmuch as the occurrence of faulty conditions in the high-tension feeder circuit may cause the disconnection of the feeder circuit from its source, it is desirable to isolate the transformer from other sources of supply, such as the secondary network, to permit workmen to clear the faulty conditions in the high-tension feeder circuit. Since the high-tension lines may be disconnected from their source of energy at the main station, it is essential that they shall not be energized from the network through the distributing transformers since the transformed voltage might be sufficient in magnitude to cause injury or death to those working upon the line.

It is, therefore, necessary to provide a system that, in addition to being automatic in operation, shall obviate the energization of the high-tension system through the transformer from the network.

Figure 1:
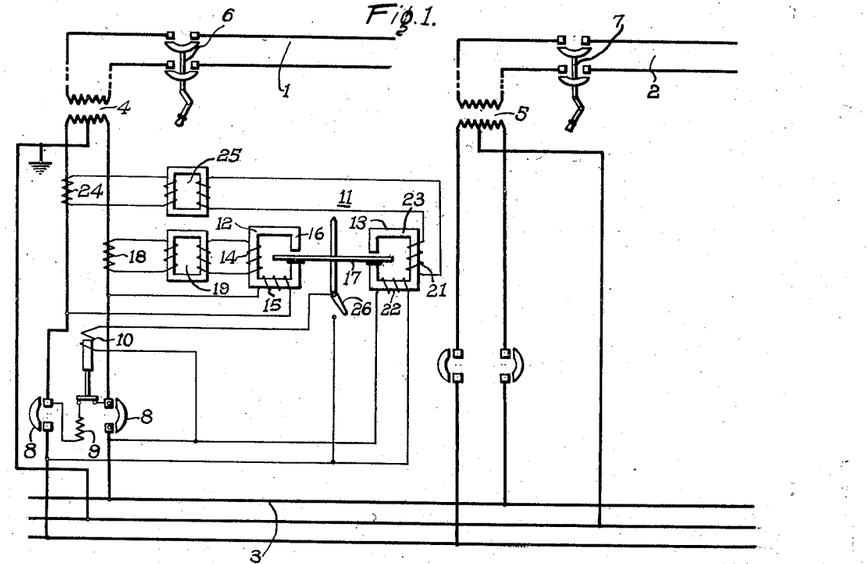
Figure 1 of the accompanying drawings, is a diagrammatic view of a system illustrating one arrangement operating in accordance with my invention.

As illustrated in Fig. 1, energy may be supplied through a plurality of high-tension primary circuits 1 and 2 to a common network 3 through distribution transformers 4 and 5. Circuit interrupters 6 and 7 are provided for the respective circuits 1 and 2 and they may be controlled at the main station or stations from which the primary circuits are energized to disconnect such circuits from the primary windings of the distribution transformers.

In order to control, automatically, the connection and disconnection of the secondary winding of the transformer 4 to the network 3, I provide a switching device or switch or interrupter 8 comprising an operating coil 9 and a voltage relay 10 for controlling the circuit of the operating coil. While I have shown the switching device 8 as having a low voltage release coil, it may be of the shunt or current trip type.

In order to control the operation of the switching device 8, I also provide a relay 11 of the differential type comprising two elements 12 and 13. The element 12 is provided with a current winding 14 and a potential winding 15 that cooperate to energize the magnetic core member 16 in such manner as to actuate a movable disk 17 in one direction or the other, according to the degree of energization of the winding 15 and the direction of the current flowing in the winding 14.

The current coil 14 is energized from the secondary circuit of the distribution transformer 4 through a current transformer 18 and a saturable transformer 19 to limit the value of current which may be caused to traverse the winding 14. The winding 15 is energized from the transformer side of the low-tension switch 8 in accordance with the secondary voltage of the transformer 4.

The element 13 of the differential relay 11 is similarly provided with a current winding 21 and a potential winding 22 that cooperate to energize a magnetizable core member 23 to effect the operation of the disk member 17 in the one direction or the other, depending upon the voltage and the direction of the energy traversing the current winding.

The current winding 21 is energized from the secondary circuit of the distribution transformer 4 through a current transformer 24 and the saturable transformer 25 to preclude the excessive energization of the winding. The potential winding 22 is energized from the network side of the switch 8 and is energized in accordance with the voltage of the network 3.

The disk member 17 is controlled by the respective elements 12 and 13 to control the operation of a switch or contact member 26 which controls the circuit of the voltage relay 10 associated with the operating coil 9 of the low-tension switch or interrupter 8.

The several elements of the relay 11 are intended to represent wattmeter elements and are so calibrated and adjusted that the network voltage alone tends to close the relay switch 26 while the transformer voltage alone tends to open the relay switch 26. The relay is so calibrated and adjusted that, when the transformer voltage is at least equal to that of the network, so that the transformer is in energy delivering condition, the torque developed by the transformer voltage through the coil 15 will overcome the torque developed by the potential winding 22, energized from the network, and the switch 26 will be opened.

As the switch 26 is opened, the relay 10 closes the circuit of the operating coil 9 which is thereupon energized from the secondary winding of the transformer 4 to close the low-tension switch 8. The transformer 4 is thereupon connected to the network 3 through the network switch.

The relations of the current windings 14 and 21 are such that when energy is delivered to the network 3 in the proper direction, the relay 11 will be actuated to maintain the switch 26 open. However, upon the occurrence of a condition which effects a reversal in the direction of the energy transferred so that energy is delivered to the transformer from the network, the relay 11 is operated to close the switch 26, thereupon operating the relay switch 10 to open the circuit of the operating and holding coil 9. The switch 8 is thereupon permitted to open and the transformer is disconnected from the network until the conditions which cause the reversal in energy are cleared.

A reversal in energy might be caused by a fault in the transformer, the high voltage circuit supplying the transformer, or by the disconnection of the primary circuit between the transformer and the source of supply. In the latter case, the reverse energy would be that supplied as magnetizing energy to the transformer from the network which is energized from other uninterrupted sources such as through the transformer 5.

Similar switching equipment and control apparatus, therefore, is provided for the transformer 5, but is not illustrated since the construction and operation of the apparatus is the same as that illustrated in connection with transformer 4.

Figure 2:
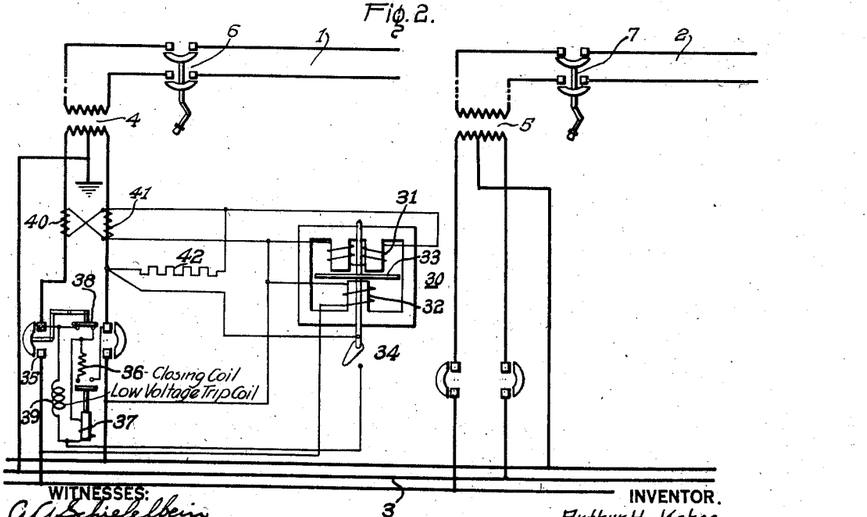
Figs. 2, 3, 4 and 5 are modifications of the arrangement that is illustrated in Fig. 1.

In Fig. 2 is illustrated a modification in which I employ a single-phase induction type wattmeter as the control relay. The relay device comprises a current winding 31, a potential or voltage winding 32 and a disk member 33 that is controlled in accordance with the direction of energy traversing the transformer secondary circuit. The disk member 33 controls a spindle and associated switch 34 that serves to control the operation of the switch or circuit-interrupter or switching device 35 to connect the transformer 4 to the network 3.

The switch 35, as employed in the arrangement illustrated in Fig. 2, comprises, in addition to the main contact members, an operating or closing coil 36, a voltage relay 37 that controls the circuit of the operating coil 36, a cutoff switch 38 that opens the circuit of the operating coil 36 after the switch is actuated to, and latched in, closed position. The switch 35 further comprises a trip coil 39 which, when deenergized or energized less than a predetermined degree, releases mechanism to actuate the latch to permit the switch to open.

The current winding 31 of the relay 30 is energized from two saturable current transformers 40 and 41. The potential coil 32 is energized from the network side of the switch 35 in accordance with the voltage of the network 3. A resistor 42 is so connected between the current winding 31 and the transformer secondary and network circuits as to bridge one of the break contact members or interruption points of the switch 35.

Let it be assumed that the transformer has been disconnected from the main feeder circuit and from the network and that the switch 6 has been closed to connect the feeder circuit to the transformer 4. There is then no current traversing the current transformers 40 and 41 that will serve to energize the current winding 31. The winding 31 is energized, however, to a slight extent by current in the circuit, including the current winding 31, the resistor 42 and the right-hand portion of the transformer secondary, together with the load connected between the corresponding conductors of the secondary network 3.

The relay 30 is so calibrated and adjusted that it will creep to closed position when the transformer is energized and the potential difference between the transformer secondary and the network is relatively small and in the proper phase position. The switch 34 will thereupon be closed to energize the relay switch 37 and the low-voltage trip coil 39, in accordance with the transformer secondary voltage. The relay switch 37 will close the circuit of the operating coil 36 of the switch 35. The operating coil 36 is thereupon energized from the transformer secondary to actuate the switch 35 to its closed position in which it is then latched. After the switch latches, the cutoff switch 38 is opened to open-circuit the operating coil 36 to preclude further energization thereof. The relay 37 is also similarly de-energized by the opening of switch 38. So long as the transformer secondary voltage remains above the drop-out value of the low-voltage trip coil 39 and the energy is transferred from the transformer to the network, the switch will be held latched in its closed position.

If now the main feeder circuit 1 should be de-engerized, the magnetizing current directed to the secondary winding of the transformer 4 from the network would energize the current winding 31 in such direction as to effect a torque to open the relay switch 34. The low-voltage trip coil 39 would thereupon be de-energized to release the latch actuating mechanism which would permit the switch 35 to open.

Upon the opening of the switch 33, the current winding 31 is connected between the transformer secondary and the network 3 across the terminals of one of the bridging members of the switch 35 in circuit with the limiting resistor 42 which may be of iron or tungsten with oxidation preventive means. So long as the potential gradient between the network and the transformer is in the direction of the transformer, the slight amount of energization received by the current winding 31 is sufficient, in co-operation with the voltage winding 32, to effect a torque on disc 33 to maintain the switch 34 open. The switch 34 will thus be maintained open until the transformer is again energized and if the transformer secondary voltage either balances or overbalances the voltage of the network and the proper phase relation between the voltages exist, the operation of the relay 30 will be such as to effect the reclosure of the relay switch 34 to re-energize the voltage relay 37 and the operating coil 36 of the switch 35. The transformer 4 will then be reconnected to the network 3 to supply energy thereto.

Thus, so long as the conditions are proper and the transformer is in energy delivering condition, it will be connected to the network. When the transformer is disconnected from its source of energy or is otherwise rendered nonoperative, as by faulty conditions in the transformer or in the feeder circuit on the transformer side of the network switch 35, then the switching device 35 is actuated to disconnect the transformer 4 from the network 3.

Figure 3:
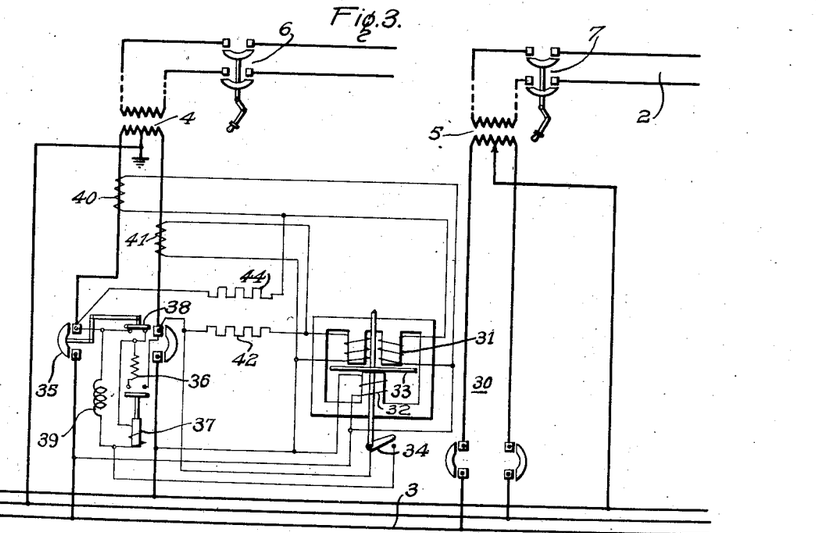

Fig. 3 illustrates a system similar to that shown in Fig. 2 with the exception of the relay 30 having two separate current windings 31, energized from the current transformers 40 and 41, respectively, and an added resistor 44 similar to the resistor 42 which is connected to one of the current windings 31 while the other resistor 42 is connected to the other of the current windings. The operation of the arrangement shown in Fig. 3 is otherwise the same as already specified in explaining the operation of the system shown in Fig. 2.

Figure 4:
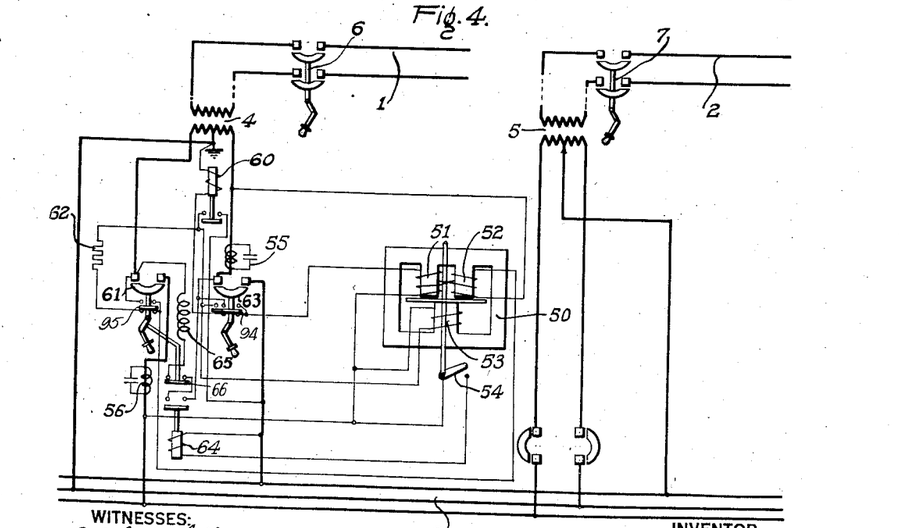

In order to obviate losses in the relay windings, while the associated transformer 4 is disconnected from the system by reason of its de-energization which may result from opening the interrupter 6 at the main station, I provide an arrangement, such as illustrated in Fig. 4, whereby the relay windings are not energized except when the associated transformer is connected to its source of energy in the main station.

Figure 6:
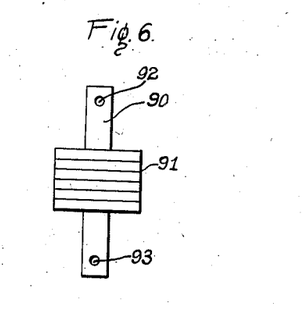
Fig. 6 is an elevational view of a reactive shunt.

In the arrangement that is illustrated in Fig. 4, a relay 50 for controlling the operation of the low-tension switch or interrupter 61, 63 comprises a flux-producing means having two current windings 51 and 52, another flux-producing means having a potential winding 53, and a switch 54 that is controlled by the movable element 33 of the relay. In order to procure energy for the current windings 51 and 52, I provide instead of saturable current transformers, a plurality of saturable reactive shunts 55 and 56 that may be constructed of iron wire wound around the main conductor or of iron laminations or washers similarly disposed, as illustrated in Fig. 6 of the drawings.

When the primary circuit of the transformer is de-energized and the switch between the transformer and network is open, the control relay is entirely de-energized. When it is desired to reconnect the transformer to the network, the main switch 6 in the primary feeder circuit is closed to energize the primary winding of the transformer 4 and the voltage induced in the secondary winding of the transformer serves to energize a relay 60, the winding of which is connected in series with the winding 51 of the control relay 50 through auxiliary switch contact member 94. The relay 60, in closing, connects the potential winding 53 of the relay 50 across the conductors of the network to subject it to the voltage thereof. Simultaneously, the relay switch 60 connects the winding 52 in series with a resistor 62, similar to the resistors 42 and 44 in Fig. 3, and with the auxiliary switch contact 95 across the net work conductors to subject the winding 52 to the network voltage. All three windings of the relay are now energized and if the transformer secondary voltage is sufficient to counteract or overbalance the network voltage and is in proper phase relation, so as to be in energy delivering condition relative to the network, the relay 50 will permit its switch 54 to close. The switch 54, in closing, connects the low-voltage coil 64 of the main switch across the conductors of the network. The low-voltage coil 64 closes a switch that is in circuit with the operating coil 65 to close the main switch contact members 61 and 63.

The switch 61, 63 is actuated to closed position and, is latched in such position, after which the switch 66 is opened to preclude further energization of the operating coil 65. The switch 61, 63 remains in latched position until the low-voltage coil 64 is de-energized either by reason of low-voltage or by the opening of the relay switch 54. Under such conditions, the low-voltage coil releases mechanism that actuates the latching means to permit the switch to open.

After the main switch closes, contact members 61 and 63 are closed and the relay potential winding 53 is energized from the network conductors. Moreover, the current winding 51 now obtains its energization from the reactive shunt 55 and the current winding 52 obtains its energization from the reactive shunt 56. That is to say, the current winding 51 now being connected in parallel-circuit relation with the reactive shunt 55, obtains its energization from the voltage drop across the reactive shunt 55 and it is, therefore, energized in accordance with the magnitude and phase position of the current traversing the main conductor to which the reactive shunt 55 is connected. The circuit of the current winding 51 may be traced as follows. Beginning at a point in the main-line conductor at a point adjacent to the reactive shunt 55 and above the reactive shunt 55 in Fig. 4, a light-weight line is shown leading directly to the winding 51 of the relay 50. The circuit then continues through the winding 51, through the contact member 94 of the switch or interrupter 63, which is now in closed position, and, consequently, places the mechanically interconnected contact 94 in its upper position, and finally back to the main-line conductor to a point on the opposite side of the reactive shunt 55. Thus, the current winding 51 is energized in accordance with the voltage drop across the reactive shunt 55.

In a like manner, the current winding 52 is energized in accordance with the voltage drop across the reactive shunt 56 when the switch 61 is in closed position. So long as the energy is supplied to the network from the transformer, the relay 50 will maintain the switch 54 in closed position. Now should the primary circuit of the transformer be de-energized, or should other conditions occur which would cause energy to be delivered to the transformer from the network, the energy reversal will cause the control relay 50 to open the switch 54 with the resultant opening of the main switch contact members 61 and 63 to disconnect the transformer from the network.

By means of the arrangement just described, the control relays may be de-energized until the actual connection of the switch to the system is desired.

This feature relating to the de-energized relays is especially emphasized, as well as the closing feature which is obtained without the utilization of any purely electrical connection across the break contacts of the interrupter.

With reference to the de-energized relay feature illustrated in connection with Fig. 4, it may be said that the relay apparatus 50 is completely de-energized when its associated transformer 4 is disconnected from the high-tension circuit or source 1, or when the associated high-tension interrupter 6 is open, or when the primary circuit of the associated transformer 4 is de-energized. Or, stated conversely, the relay apparatus 50 is energized only when its associated high-tension circuit is energized or its associated high-tension interrupter 6 is closed, regardless of the number of other independent feeders that may be supplying energy to the common network or load circuit 3. Thus, the energization of the network-interrupter control means is independent of the other feeder circuits that may be feeding energy to the same network.

Another of the features of this invention, as illustrated in Fig. 4, is that involving the network-interrupter closing means which is not only responsive to the phase position of the voltage across the break contacts of the interrupter but also has no purely electrical connection across the break contacts to obtain such phasing feature in the closing operation. There is no single winding connected in circuit with such break contacts. The connection is one including a magnetic circuit, namely, that of the relay 50. The connection is, therefore, not electrical, exclusively. Thus, when the network interrupter 61—63 is open, the interrupter 6 associated therewith being closed, the winding 51 is energized by the circuit on the transformer side of the interrupter 61—63, and the winding 52 is energized by the network circuit. The windings 51 and 52 not being connected together, there is no electrical connection across the break contacts of the interrupter 61—63. The phasing-voltage circuit is completed magnetically by means of the magnetizable armature and core 50.

The fore-mentioned features are illustrated in Fig. 4 and may serve to distinguish the invention from the prior art, including that taught by U. S. Patent No. 1,597,865 to Palmer.

Another feature not disclosed in the prior art which may be specially mentioned is the utilization of the saturable reactive shunts 55 and 56, illustrated in Fig. 4 also.

In the several modifications thus far described, it will be observed that I have utilized one or more of the windings of the relay as a current winding when the network switch is closed connecting the transformer to the network and as a potential winding to measure the potential differences between the transformer and the network when the switch is open.

Figure 5:
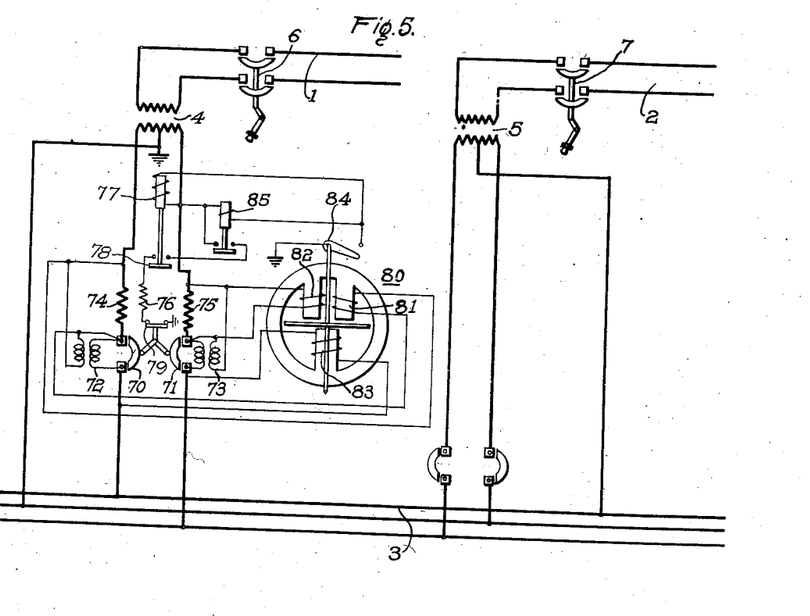

In Fig. 5, I have illustrated another system whereby I may obtain selective control of a switching device for connecting a transformer to a network. Main switch members 70 and 71, that serve to connect the transformer secondary to the network, are bridged by primary windings of two transformers 72 and 73. Two saturable reactive shunts 74 and 75 are disposed in the circuit between the transformer secondary and the switch members 70 and 71. The operating mechanism for the switch members comprises an operating coil 76, a low-voltage mechanism 77 which also controls a switch 78 that is disposed in the circuit of the operating coil 76, and an auxiliary switch 79 that is closed when the main contact members 70 and 71 are open, and opens after the main contact members are actuated to closed position and latched closed.

In order to control the operation of the switch 70—71, I provide a directional relay 80 comprising two current windings 81 and 82, a potential winding 83, and a switch 84 that is closed when the relay 80 is energized in such manner as to indicate that the transformer is in energy delivering condition relative to the network or that the transformer is delivering power to the network. Under such conditions, the relay will maintain the switch 84 in closed position. When the transformer is not in energy delivering condition or, when the network is supplying energy to the transformer, the relay will open the switch 84. When the main switch contact members 70 and 71 are open, the current windings 81 and 82 are respectively energized from the secondary windings of the phasing transformers 72 and 73, respectively. When conditions are proper to close the switch, the relay closes its switch 84, whereupon the low-voltage mechanism 77 and a relay switch 85 are energized from the transformer secondary. The relay switch 85 connects the operating coil 76 to the transformer secondary through switch 78 and the coil 76 is thereupon energized to close the main switch contact members 70—71. Immediately after the main switch contact members are closed, auxiliary switch 79 opens to preclude the further energization of the operating coil 76.

Simultaneously with the energization of the relay 85, the switch has closed the energizing circuit of the low-voltage coil 77. As soon as the main switch contact members 70 and 71 are closed, the phasing transformers 72 and 73 are short-circuited and the current windings 81 and 82 are then energized from the reactive shunts 74 and 75, respectively.

So long as the transformer is energized and is delivering energy to the network, the relay switch 84 remains closed. Upon a reversal of energy, for any reason, the relay 80 will open the switch 84 and de-energize the low-voltage coil 77. Immediately the mechanism is released to actuate the latching mechanism, whereupon the switch contact members 70 and 71 are again opened to disconnect the transformer from the network.

The employment of the current windings as phasing coils when the main switch contact members are opened may be readily seen from the arrangement that is illustrated in Fig. 5.

In Fig. 6, I have illustrated a preferred form of reactive shunt which I employ in this system. The shunt comprises a bar 90 of current-conducting material, such as copper or brass, a plurality of iron or steel stampings 91 and two terminals 92 and 93 to permit connection of the relay windings to the shunt. By employing the proper size of conductor and of iron in the stampings or laminations, the shunt may be constructed to have a saturating characteristic at a predetermined value of current flowing through the bar 90, which is connected in the transformer secondary circuit, and thus prevents injury to the windings and excessive energization thereof when abnormal currents traverse the transformer secondary circuit. The shunts cause a large proportion of the current to traverse the relay windings at light loads and limit the maximum amount of current at large loads.

My invention thus contemplates an automatic reclosing circuit interrupter which shall serve to connect the transformer to a secondary network when the transformer is in proper energy delivering condition relative to the network and will also serve to disconnect the transformer from the network when the primary circuit is de-energized or when such faulty conditions occur as may cause the reversal of energy resulting in energy being supplied to the transformer from the network.

My invention is not limited to the specific arrangements illustrated, since various modifications may be made in the arrangement of the elements without departing from the spirit and scope of my invention, as set forth in the appended claims.

I claim as my invention:

1. The combination with a plurality of transformers for energizing a common network load, of a circuit interrupter between each transformer and the load, and interrupter-control means including a relay having a flux-producing means including a winding responsive to the network voltage only and another flux-producing means responsive to circuit current when the interrupter is closed and responsive to the voltage across the interrupter break contacts when the interrupter is open and characterized in that said control means effects only a magnetic connection across said interrupter break contacts.

2. The combination with a plurality of transformers for energizing a common network load, of a circuit interrupter between each transformer and the network, and interrupter-control means including a relay electrically-closed and having a plurality of flux-producing means one being responsive to the network voltage only and another being responsive to the magnitude and phase position of the circuit current when the interrupter is closed and responsive to the magnitude and phase position of the voltage across the break contacts of the interrupter when the interrupter is open, said control means characterized in that only a magnetic connection is effected across said interrupter break contacts.

3. The combination with a circuit interrupter for controlling the connections of a circuit to a load, of interrupter-control means including a relay electrically-closed and having a plurality of flux-producing means one being responsive to the voltage on the load side only of the interrupter and another being responsive to the magnitude and phase position of the circuit current through the interrupter when the interrupter is closed and responsive to the magnitude and phase position of the voltage across the break contacts of the interrupter when the interrupter is open, said control means characterized in that only a magnetic connection is effected across said interrupter break contacts.

4. The combination with a circuit interrupter for controlling the connections of a circuit to a load, of interrupter-control means including saturable means in the circuit, a relay electrically closed and having a plurality of flux-producing means, one being responsive to the voltage on the load side only of the interrupter and another being responsive to the saturable means when the interrupter is closed and responsive to the voltage across the break contacts of the interrupter when the interrupter is open.

5. The combination with a plurality of transformers for energizing a common network load, of a circuit interrupter between each transformer and the network, and interrupter-control means including saturable means in the circuit between the transformer and circuit interrupter and a relay electrically closed and having a plurality of flux-producing means, one being responsive to the voltage on the load side only of the interrupter and another being responsive to the saturable means when the interrupter is closed and responsive to the voltage across the break contacts of the interrupter when the interrupter is open.

6. The combination with a plurality of transforming means connected on one side to a common network load and on the other side to a source of electric energy, of an interrupter between the source and each transforming means, a network interrupter between each transforming means and the network load, and control means for each network interrupter including closing means responsive to the voltage across the break contacts of the network interrupter, said control means being adapted to be de-energized when the associated first-named interrupter is open and when the network is energized by other transforming means.

7. The combination with a plurality of transformers connected on one side to, and supplying energy to, a common network load and on the other side fed from a source of electric energy, of an interrupter between the source and each transformer, a network interrupter between each transformer and the network load, and network-interrupter control means dependent upon the relative voltages of the transformer and the network and adapted to be always de-energized when the associated first-named interrupter is open, irrespective of the energized or de-energized condition of the network.

8. The combination with a common network load fed by a plurality of circuits each including a transformer, a circuit interrupter in the primary of the transformer, a network circuit interrupter in the transformer secondary between the transformer and the network, and network-interrupter control means actuated to close the network interrupter upon approximately equal in-phase voltages on opposite sides of the network interrupter and adapted to be de-energized when the associated primary interrupter is open and the network is energized.

9. The combination with a common network load fed by a plurality of circuits, each including a transformer, a circuit-interrupter in the primary of the transformer, a network circuit interrupter in the transformer secondary between the transformer and the network, and network-interrupter control means adapted to be always de-energized when the associated primary interrupter is open and including closing means responsive to, or dependent upon, the magnitude and phase position of the voltage across the break contacts of the network interrupter.

10. The combination with a common network load fed by a plurality of circuits, each including a transformer, a circuit-interrupter in the primary of the transformer, a network circuit interrupter in the transformer secondary between the transformer and the network, and network-interrupter control means adapted to be always de-energized when the associated primary interrupter is open and including closing means responsive to, or dependent upon, the magnitude and phase position of the voltage across the break contacts of the network interrupter and including opening means responsive to the magnitude and phase position of the current flowing through the closed network interrupter.

11. The combination with a circuit interrupter, of interrupter control means including closing means dependent upon the magnitude and phase position of the voltage across the break contacts of the open interrupter, said closing means having only a magnetic connection across said break contacts of the open interrupter and including opening means dependent upon the magnitude and phase position of the current flowing through the closed interrupter.

12. The combination with a plurality of transformers connected to a common network load, of a circuit interrupter between each transformer and the network, and interrupter control means including closing means dependent upon the magnitude and phase position of the voltage across the break contacts of the open interrupter, said closing means having only a magnetic connection across said break contacts of the open interrupter and including opening means dependent upon the magnitude and phase position of the current flowing through the closed interrupter.

13. The combination with a circuit interrupter, of interrupter control means including a single relay responsive to magnitude and phase position of the voltage across the break contacts of the open interrupter and having only a magnetic connection across the open contacts of said interrupter.

14. The combination consisting of a plurality of circuits connected to a common network load, each circuit including a transformer, a primary circuit interrupter between the transformer and a source of energy, a secondary circuit interrupter between the transformer and the network, and secondary interrupter control means adapted to be always de-energized, irrespective of the energized condition of the network when its associated primary interrupter is open and having an electro-magnetic connection but no electrical connection across the break contacts of the secondary interrupter.

15. In combination, a plurality of circuits connected to a common network load, each circuit including a transformer, a primary circuit interrupter between the transformer and a source of energy, a secondary circuit interrupter between the transformer and the network, and secondary interrupter opening and closing means adapted to be de-energized irrespective of the energized condition of the network when its associated primary switch is open and having a magnetic but no electrical connection across the break contacts of the secondary interrupter.

16. In combination, a plurality of circuits connected to a common network load, each circuit including a transformer, a primary circuit interrupter between the transformer and a source of energy, a secondary circuit interrupter between the transformer and the network, and secondary interrupter opening and closing means adapted to be de-energized when its associated primary interrupter is open, said closing means including magnetically cooperating elements connected for energization, respectively, in accordance with the voltage on both sides of the open secondary interrupter, said closing means being responsive to the magnitude and phase position of the voltage across the break contacts of the open secondary interrupter.

17. The combination consisting of a plurality of circuits feeding a network load circuit, each circuit including a transformer, a network circuit-interrupter between the transformer and the load circuit, and network interrupter control means including saturable means comprising reactive shunts, and an electrically-closed relay having a flux-producing means responsive to the phase position of the voltage across the break contacts of the network interrupter and also responsive to voltage across the reactive shunt means and having a magnetic connection across said break contacts and having another flux-producing means energized from the network only, said control means adapted to be de-energized when the associated transformer is deenergized irrespective of the energized condition of the network.

18. The combination consisting of a plurality of feeders connected to a load circuit, each feeder including a primary circuit-interrupter, a secondary circuit-interrupter, a transformer therebetween, saturable means including a reactive shunt, and secondary interrupter control means responsive to said saturable means and responsive to approximately equal in-phase voltages on both sides of said secondary interrupter.

19. A transformer-circuit-controlling system for alternating-current networks wherein a switch is provided for connecting and disconnecting the secondary of the transformer and the network in accordance with the direction of current flow in the transformer secondary comprising, in combination, a directional relay provided with a voltage-responsive winding and a current coil with its terminals connected, respectively, to the network and the transformer secondary, whereby said coil is directly connected in a circuit between said network and said transformer secondary, an impedance in series with said current coil for limiting the current through the current coil when said switch is open, said current coil co-operating with said voltage-responsive winding to operate the relay to effect closing of said switch when current flows from said transformer secondary to said network, and an inductive apparatus connected in series with the switch between said network and transformer secondary, said inductive apparatus and switch being so located relative to the point of connection of said current coil to the network and transformer secondary that said current coil is energized from said inductive apparatus when said switch is closed and cooperates with said voltage-responsive winding to operate the relay to effect opening of said switch when current flows from said network through said inductive apparatus to said transformer secondary.

20. A transformer-circuit-controlling system for alternating-current networks wherein a switch is provided for connecting and disconnecting the secondary of the transformer and the network in accordance with the direction of current flow in the transformer secondary comprising, in combination, a directional relay provided with a voltage-responsive winding and a current coil with its terminals connected respectively to the network and the transformer secondary, whereby said coil is directly connected in a circuit between said network and said transformer secondary, an impedance in series with said current coil for limiting the current through the current coil when said switch is open, said current coil co-operating with said voltage-responsive winding to operate the relay to effect closing of said switch when current flows from said transformer secondary to said network, and an inductive apparatus connected in series with the switch between said network and transformer secondary, said inductive apparatus and switch being between the points of connection of said current coil to the network and transformer secondary, whereby said current coil is energized from said inductive apparatus when said switch is closed and cooperates with said voltage-responsive winding to operate the relay to effect opening of said switch when current flows from said network through said inductive apparatus to said transformer secondary.

21. In combination, two alternating-current electric circuits, a switch for interconnecting said electric circuits, a current transformer having a primary winding connected in series with said switch and a directional relay for controlling both the opening and closing of said switch in accordance with the direction of power flow between said circuits including two operating windings, one of said windings being connected to one of said circuits so as to be energized in accordance with the voltage thereof, and means for connecting the other of said windings to the secondary of said current transformer and directly in a circuit between said electric circuits when said switch is open so that said last mentioned winding is energized in accordance with the direction of current flow in said current transformer when said switch is closed and is directly energized in accordance with the difference in magnitude and phase of the voltage between said circuits when said switch is open.

22. In combination, two alternating-current electric circuits, a switch for interconnecting said electric circuits, a current transformer having its primary connected in series with said switch, a directional relay for controlling the opening and closing of said switch in accordance with the direction of power flow between said circuits including a voltage winding connected so as to be energized in accordance with the voltage of one of said circuits and a current winding, and means for connecting said current winding to the secondary of said current transformer and directly in a circuit between said electric circuits when said switch is open so that it is energized in accordance with the direction of current flow in said current transformer when said switch is closed and is energized directly in accordance with the difference in magnitude and phase of the voltage between said electric circuits when said switch is open, said current coil cooperating with said voltage coil both when said switch is open and when it is closed to operate the relay for effecting the closing of said switch when current flows in one direction between said electric circuit and for effecting the opening of said switch when current flows in the reverse direction between said electric circuits.

23. A transformer circuit-controlling system for alternating-current networks wherein a switch is provided for connecting and disconnecting the secondary of the transformer and the network including in combination a directional relay for controlling the opening and closing of said switch in accordance with the direction of power flow between said circuits, said relay being provided with a voltage coil and a current coil, and a current transformer having its primary winding connected in series between said switch and said transformer secondary when said switch is closed, said current coil being connected in a circuit across the secondary of said current transformer and directly in a circuit between the transformer secondary and the network whereby when said switch is closed said current coil is energized in accordance with the direction of current in said current transformer and whereby, when said switch is open, said current coil is directly energized in accordance with the difference in magnitude and phase of the voltage between said network and said transformer secondary.

24. A transformer circuit-controlling system for alternating-current networks wherein a switch is provided for connecting and disconnecting the secondary of the transformer and the network in accordance with the direction of current flow in the transformer secondary, including in combination a directional relay provided with a voltage-responsive winding and a current-responsive winding, a current transformer connected in series with the switch between the network and the transformer secondary, an impedance connected in a circuit between said current transformer secondary and said network, said current-responsive winding being connected in a circuit across the secondary of said current transformer and in a circuit with said impedence between said transformer secondary and the network, whereby, when said switch is closed, said current-responsive winding is energized in accordance with the direction of current flow in said current transformer and cooperates with said voltage-responsive winding to operate the relay to effect opening of said switch when current flow is from said network to said transformer secondary, and whereby, when said switch is open, said current-responsive winding is energized in accordance with the direction of current in the circuit between said transformer secondary and the network and cooperates with said voltage coil to operate the relay to effect closing of said switch when current flow is from said transformer secondary to said network.

25. In combination, two alternating-current circuits, a switch for interconnecting said circuits, and means for controlling the operation of said switch including a current transformer having its primary connected in series with said switch, and a directional relay including a voltage coil permanently connected across one of said circuits, and a current coil directly and permanently connected both across the secondary of said current transformer and across the contacts of said switch.

26. In combination, a power transformer, an alternating-current network, means for supplying alternating current to the primary of said power transformer, switching means between the secondary of said transformer and said network, and means for controlling the operation of said switching means including a current transformer having its primary winding connected in series with said switching means when closed, an impedance, and a directional relay provided with a voltage coil permanently connected across said network and a current coil directly and permanently connected both across the secondary of said current transformer and in a series circuit with said impedance between the secondary of said power transformer and said network.

In testimony whereof, I have hereunto subscribed my name this twenty-first day of January, 1924.

ARTHUR H. KEHOE.